United States Patent
Wigsten

(10) Patent No.: US 8,403,783 B2
(45) Date of Patent: Mar. 26, 2013

(54) HYDRAULIC TENSIONER WITH A BAND TYPE CHECK VALVE

(75) Inventor: Mark M. Wigsten, Lansing, NY (US)

(73) Assignee: BorgWarner Inc., Auburn Hills, MI (US)

( * ) Notice: Subject to any disclaimer, the term of this patent is extended or adjusted under 35 U.S.C. 154(b) by 1344 days.

(21) Appl. No.: 12/094,416

(22) PCT Filed: Dec. 6, 2006

(86) PCT No.: PCT/US2006/061662
§ 371 (c)(1),
(2), (4) Date: May 21, 2008

(87) PCT Pub. No.: WO2008/027067
PCT Pub. Date: Mar. 6, 2008

(65) Prior Publication Data
US 2008/0293526 A1  Nov. 27, 2008

Related U.S. Application Data

(60) Provisional application No. 60/749,832, filed on Dec. 13, 2005.

(51) Int. Cl.
*F16H 7/22* (2006.01)
(52) U.S. Cl. .......... 474/110; 474/109; 474/111
(58) Field of Classification Search .......... 474/110, 474/111, 109, 138, 113, 140, 136, 137
See application file for complete search history.

(56) References Cited

U.S. PATENT DOCUMENTS

| | | |
|---|---|---|
| 405,670 A | 6/1889 | Hyatt |
| 1,366,151 A | 1/1921 | Astrom |
| 2,671,466 A | 3/1954 | Conrad |
| 2,918,941 A | 12/1959 | Whiting |
| 2,941,541 A | 6/1960 | Peras |
| 3,129,784 A | 4/1964 | Smallpeice |
| 3,154,486 A | 10/1964 | Weaver |
| 3,298,394 A | 1/1967 | Chorkey |
| 3,363,644 A | 1/1968 | Malec |
| 3,424,319 A | 1/1969 | Hohlfelder, Jr. |
| 3,451,422 A | 6/1969 | Chorkey |
| 3,459,217 A | 8/1969 | Callahan |
| 3,528,328 A | 9/1970 | Jeanneret |
| 3,610,273 A | 10/1971 | Russell |
| 3,619,898 A | 11/1971 | Perry et al. |
| 3,807,444 A | 4/1974 | Fortune |
| 3,831,628 A | 8/1974 | Kintner et al. |

(Continued)

FOREIGN PATENT DOCUMENTS

| | | |
|---|---|---|
| EP | 0989330 | 3/2000 |
| EP | 1447602 | 8/2004 |

(Continued)

OTHER PUBLICATIONS

PCT Search Report and Written Opinion mailed Nov. 20, 2007 for PCT/US2006/061662.

(Continued)

*Primary Examiner* — William A Rivera
(74) *Attorney, Agent, or Firm* — Brown & Michaels, PC

(57) ABSTRACT

A hydraulic tensioner includes an inlet portion which defines a pressurized fluid inlet. The hydraulic tensioner also includes a housing defining a chamber which is coupled to the inlet portion. A band check valve separates the pressurized fluid inlet from the chamber, and a piston slideably engages the housing. A method of manufacturing the hydraulic tensioner is also disclosed.

29 Claims, 7 Drawing Sheets

U.S. PATENT DOCUMENTS

| | | |
|---|---|---|
| 3,865,133 A | 2/1975 | Alford |
| 3,882,891 A | 5/1975 | Viles et al. |
| 3,896,848 A | 7/1975 | Sypitkowski |
| 3,975,817 A | 8/1976 | Frazier |
| 4,095,617 A | 6/1978 | Hodgson |
| 4,214,607 A | 7/1980 | Bouteille |
| 4,237,935 A | 12/1980 | Delmonte et al. |
| 4,549,565 A | 10/1985 | Short, III |
| 5,417,241 A | 5/1995 | Tischer et al. |
| 5,672,103 A | 9/1997 | Jardinier |
| 5,989,139 A * | 11/1999 | Dusinberre et al. .......... 474/110 |
| 5,993,342 A | 11/1999 | Wigsten et al. |
| 6,273,137 B1 | 8/2001 | Jacobsen et al. |
| 6,590,267 B1 | 7/2003 | Goodwin-Johansson et al. |
| 2003/0070713 A1 | 4/2003 | Cornea et al. |
| 2003/0106589 A1 | 6/2003 | Basso |

FOREIGN PATENT DOCUMENTS

| | | |
|---|---|---|
| GB | 1527208 | 10/1978 |
| JP | 53-14419 A2 | 2/1978 |
| JP | 60065945 | 4/1985 |
| JP | 63-11956 U | 1/1988 |
| JP | 07280788 A | 10/1995 |
| JP | 11013430 A | 1/1999 |
| JP | 2002-039294 A | 2/2002 |
| JP | 2002-054700 A | 2/2002 |
| JP | 2004-508952 A | 3/2004 |
| WO | 02/22492 A2 | 3/2002 |

OTHER PUBLICATIONS

Automotive Handbook, Bosch, "Electrohydraulic Pumps and Small Units"; pp. 634-637.

Pictorial Handbook of Technical Devices, Grafstein et al.; "C-Valves", 2 pages.

English translation of Office action for Japanese Patent Application No. 2008-545911, mailed Jan. 17, 2012, 2 pages.

English translation of Office action for Japanese Patent Application No. 2008-545911, mailed Aug. 16, 2012, 1 page.

* cited by examiner

HYDRAULIC TENSIONER WITH A BAND TYPE CHECK VALVE

REFERENCE TO RELATED APPLICATIONS

This application claims an invention which was disclosed in Provisional Application No. 60/749,832, filed Dec. 13, 2005, entitled "HYDRAULIC TENSIONER WITH A BAND TYPE CHECK VALVE". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of hydraulic tensioners. More particularly, the invention pertains to a hydraulic tensioner with a band type check valve.

2. Description of Related Art

In automobiles, hydraulic tensioners may be applied to a timing system or an auxiliary drive (e.g. oil pump) system. A hydraulic tensioner generally includes a housing, a piston slideably engaging the housing biased in a protruding direction by a spring, and a fluid chamber defined by the piston and the housing. During operation of the tensioner, external force from a chain or belt is imparted on the distal end of the piston. The force on the distal end is balanced by the tensioner spring load and hydraulic pressure in the chamber. Over time, the volume of the chamber may increase as the piston slides away from the housing, creating a need for more hydraulic fluid to fill the chamber. Hydraulic fluid may also need to be replenished in the chamber as fluid leaks out of the chamber.

There is a need in the art for a hydraulic tensioner with a low-cost check valve to facilitate replenishing the hydraulic fluid within the chamber, which is also simple to manufacture and reliable.

SUMMARY OF THE INVENTION

A hydraulic tensioner includes an inlet portion which defines a pressurized fluid inlet, a housing defining a chamber which is coupled to the inlet portion, a band check valve (also known as a band valve or a band type check valve) separating the pressurized fluid inlet from the chamber, and a piston slideably engaging the housing.

A method of manufacturing the hydraulic tensioner is also described. In this method, a chamber is drilled in a housing and a hydraulic fluid inlet is drilled in an inlet portion. A band valve guide area is formed on the inlet portion. An exit hole is drilled through the band valve guide area to be in communication with the hydraulic fluid inlet and the band check valve is coupled to the band valve guide area such that the band check valve covers the exit hole and acts as a check valve between the hydraulic fluid inlet and the chamber.

A hydraulic tensioner in another embodiment includes an inlet portion having an interior and an exterior, the inlet portion defining a pressurized fluid inlet on the interior, a band valve guide area with at least one groove on the exterior, and an exit hole between the band valve guide area and the pressurized fluid inlet. The hydraulic tensioner also includes a band check valve sprung to restrict its diameter coupled to the band valve guide area of the inlet portion exterior such that the band check valve covers the exit hole. The hydraulic tensioner also includes a housing defining a chamber in an axial direction which is open to a first end of the housing, an inlet coupling hole in a radial direction which is coupled to the chamber and is sized to receive the inlet portion such that the band check valve separates the pressurized fluid inlet from the chamber and such that the band check valve may be flexed outward by hydraulic pressure to allow fluid from the pressurized fluid inlet to enter the chamber. The hydraulic tensioner further includes a piston slideably engaging the housing and hydraulically coupled to the chamber, and a spring biasing the piston away from the housing.

DETAILED DESCRIPTION OF THE INVENTION

Figure 1:
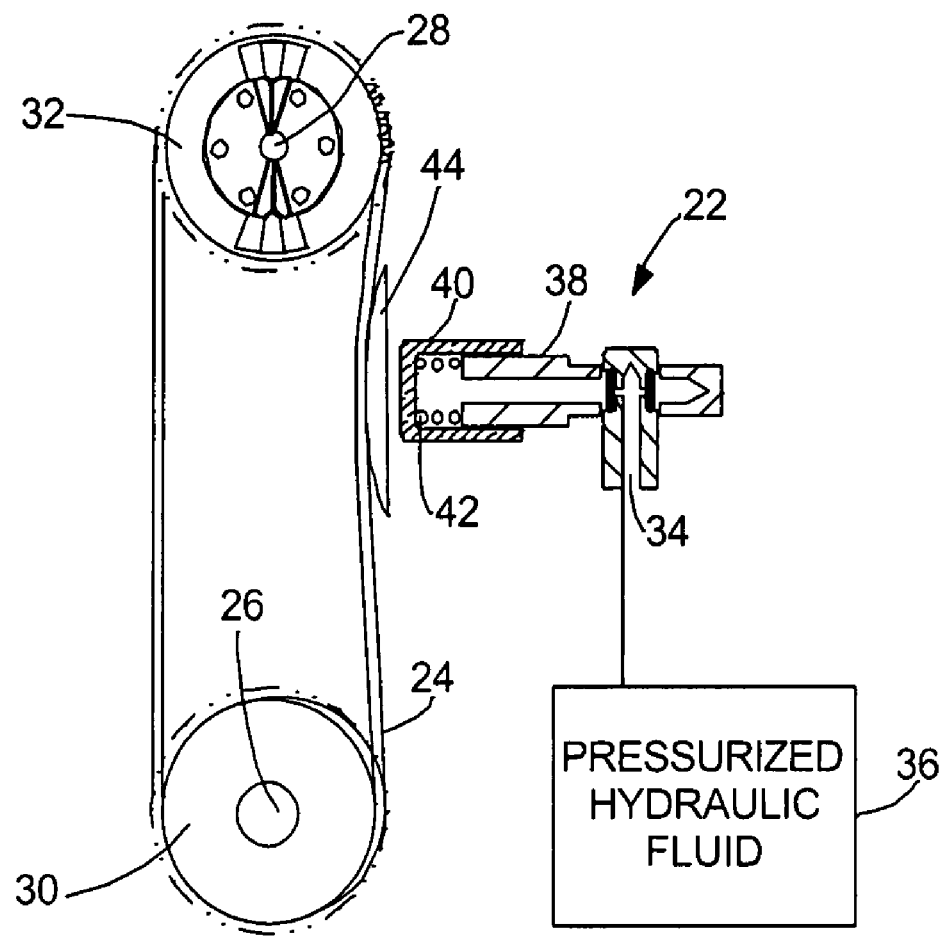
FIG. 1 illustrates a hydraulic tensioner providing tension to a timing chain in an embodiment of the present invention.

FIG. 1 schematically illustrates a hydraulic tensioner 22. A hydraulic tensioner 22 provides tension to a timing chain 24, which couples a driving shaft 26 to a driven shaft 28 via sprockets 30, 32. Although a chain and sprocket system is shown in this figure, hydraulic tensioners may alternatively be used with a pulley and belt system. Similarly, additional shafts may be coupled to the driving and driven shafts 26, 28 by the belt or chain 24. For simplicity, only two shafts are shown in this figure. The hydraulic tensioner 22 has an inlet portion 34 which is coupled to pressurized hydraulic fluid 36, such as pressurized engine oil. The hydraulic tensioner 22 also includes a housing 38 which is coupled to the inlet portion 34. The inlet portion 34 may be a separate part from the housing 38, or it may be integral to the housing 38. A piston 40 slideably engages the housing 38, and may be biased away from the housing 38 by hydraulic pressure within the housing 38 as well as a mechanical spring force provided by a spring 42. Spring 42 is coupled between housing 38 and the piston 40 and is chosen to push these two elements apart. A tensioner shoe or tensioner guide 44 may be coupled to the piston 40 to provide an interface between the hydraulic tensioner 22 and the timing chain 24.

Figure 2:
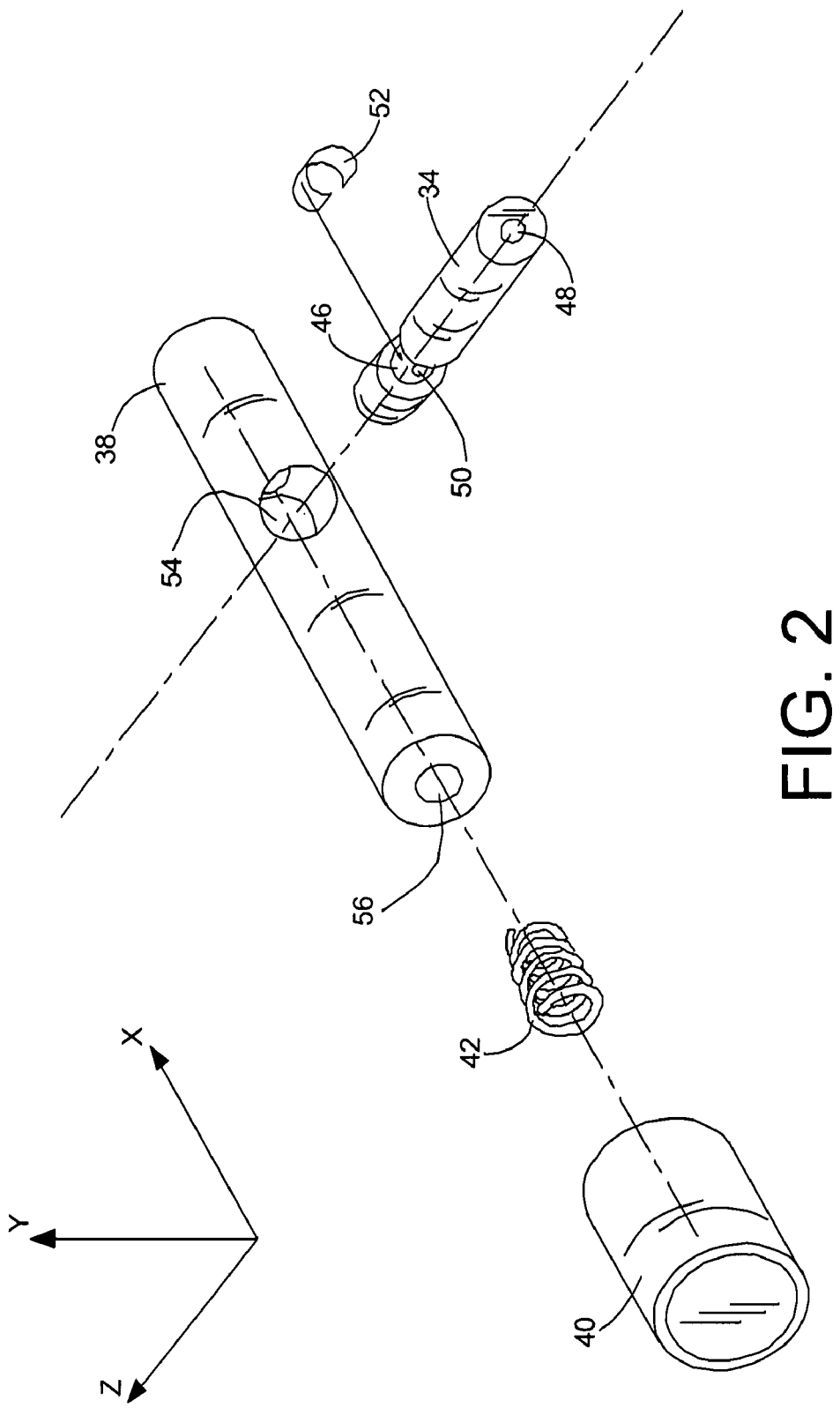
FIG. 2 illustrates an exploded view of a hydraulic tensioner having a band-type check valve in an embodiment of the present invention.

FIG. 2 illustrates an exploded view of a hydraulic tensioner 22 in an embodiment of the present invention. The inlet portion 34 in this embodiment includes a band valve guide area 46 which has been turned or formed to have a smaller diameter than the diameter of the inlet portion 34. Inlet portion 34 also defines an inlet 48 which may be coupled to the pressurized hydraulic fluid (not shown in this view). The inlet 48 runs through the interior of the inlet portion 34 at least as far as the band valve guide area 46. At least one inlet exit hole 50 is formed in the band valve guide area 46, the inlet exit hole 50 being coupled to the inlet 48. In this embodiment, the inlet portion 34 is separate from the housing 38, but in others, the inlet portion 34 could be integral to the housing 38. In one embodiment, seals 41 (see FIG. 3), such as o-rings, are located between the inlet portion 34 and the housing 38. A band style check valve 52 may be installed over the band valve guide area 46 to cover the inlet exit hole 50. In a preferred embodiment, the band check valve 52 is annular. In the embodiment shown in FIG. 2, the band check valve 52 is illustrated as encircling less than 360 degrees of the band valve guide area 46, but in other embodiments band check valves covering 360 degrees or more may be desirable. Example embodiments of band check valves and their attachment to the band valve guide area 46 of the inlet portion 34 will be discussed in further detail with regard to FIGS. 5 and 8A-8E. The band check valve 52 is positioned and/or sized to cover the inlet exit hole 50. The band check valve 52 in this embodiment is sprung in an inwards direction to be biased against the band valve guide area 46 of the inlet portion 34.

After the band check valve 52 has been attached to the inlet portion 34, the inlet portion 34 may be inserted into an inlet coupling hole 54 defined by the housing 38. The inlet portion 34 may be coupled to the housing 38 by a snap ring or a retaining clip (not shown). Alternatively, the inlet portion 34 may be threaded, passed through the housing 38, and attached in place with a fastener, such as a nut. Another method of attaching the inlet portion 34 to the housing 38 is pressing the inlet portion 34 into place. Other methods of attaching the inlet portion 34 to the housing 38 will be obvious to those skilled in the art, including embodiments where the inlet portion 34 is integral to the housing 38. The housing 38 also defines a chamber 56 which passes axially through the housing 38 at least as far as the inlet coupling hole 54. In this embodiment, a piston 40 may be slideably engaged on the outside of the chamber 56 end of the housing 38. A spring 42 is installed between the piston 40 and the housing 38. When the hydraulic pressure in the inlet 48 exceeds the hydraulic pressure in the chamber 56 plus the spring force of the band check valve 52, the band check valve 52 moves away from the inlet exit hole 50, allowing pressurized hydraulic fluid to fill the chamber 56. As pressure in the chamber 56 increases, the band check valve 52 returns to a sealing position where the inlet exit hole 50 is covered and not in fluid communication with the chamber 56.

Figure 3:
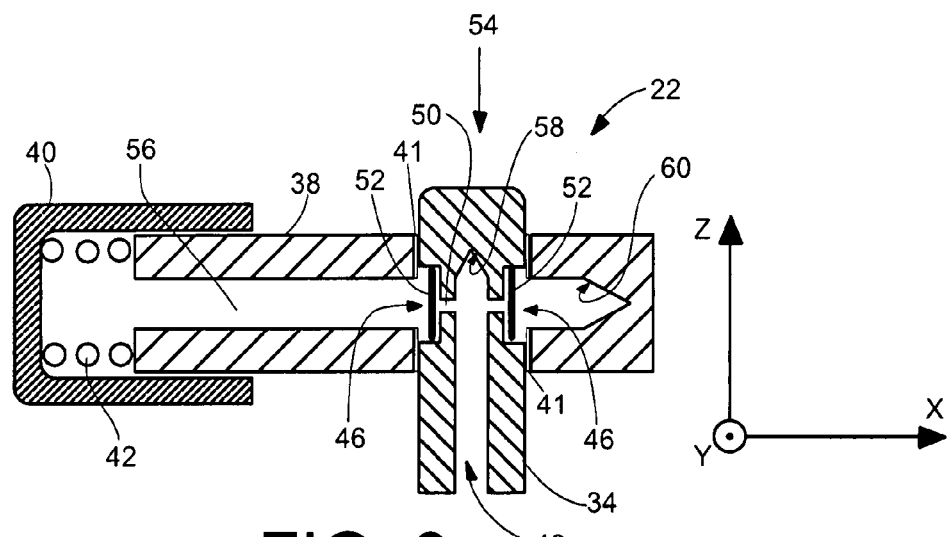
FIG. 3 illustrates the hydraulic tensioner of FIG. 2 assembled and in cross-section.

FIGS. 3-7 illustrate different embodiments of hydraulic tensioners with a band type check valve. FIG. 3 illustrates the hydraulic tensioner 22 shown in FIGS. 1-2 assembled and in cross-section. This view is useful for seeing the fluid paths within the hydraulic tensioner 22, as well as for discussing some of the manufacturing techniques and advantages involved with producing a hydraulic tensioner with a band type check valve. A drill bit may be used to bore the inlet hole 48 into the inlet portion 34. The inlet portion 34 may be sized so that a tapered portion 58 of the inlet hole 48, from the tip of a drill bit, may extend into the inlet portion 34 without interfering with the inlet exit hole 50. The inlet exit hole 50 may be bored all the way through the inlet portion 34, since the band check valve 52 may be sized to cover both ends of the exit hole 50. Although exit hole 50 is illustrated as being perpendicular to the inlet 48, in other embodiments, the exit hole 50 may be non-perpendicular, provided the exit hole 50 still falls within the band valve guide area 46 of the inlet portion 34. Similarly, the chamber hole 56 may be bored into the housing 38 with a drill bit. The housing 38 may be sized so that a tapered portion 60 of the chamber 56, from the tip of a drill bit, may extend into the housing 38 without interfering with the inlet coupling hole 54.

Pressurized fluid (not shown in this view) starts in the inlet 48 and may pass through the inlet exit hole 50 and the band check valve 52 into the chamber 56 as described above. The hydraulic pressure within the chamber 56, coupled with the spring force provided by the spring 42 biases the piston 40 away from the housing 38 (In the negative X-axis direction in this view). It should be noted that, for simplicity, the illustrated clearances between the parts in the figures of this specification have been expanded so that the individual parts may be seen.

Figure 4:
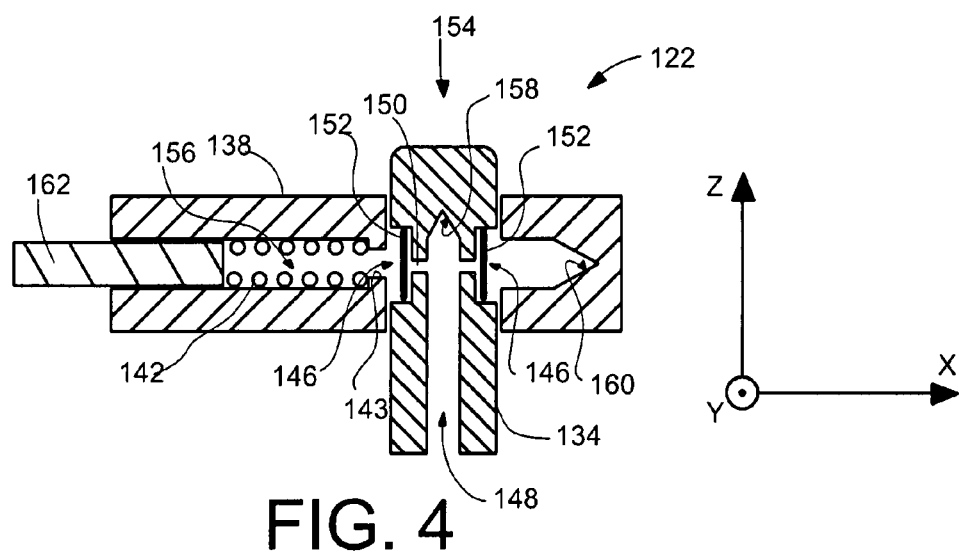
FIG. 4 illustrates a cross-section of a hydraulic tensioner in another embodiment of the present invention.

FIG. 4 illustrates another embodiment of a hydraulic tensioner 122 in cross-section. This embodiment is similar to the embodiment of FIG. 3 insofar as the operation and construction of the inlet portion 134, the band check valve 152, and the chamber 156. The piston 162 in this embodiment, however, is different. In this embodiment, the piston 162 is slideably engaged with the housing 138 on the interior of the housing 138, and the spring 142 is consequently located within the chamber 156. The chamber 156 may be provided with a lip 143 in this embodiment to keep the spring 142 from contacting the band check valve. This embodiment offers a more simple piston 162, which may just be a rod cut to length, rather than the more complex piston of FIG. 3. Both the embodiments of FIGS. 3 and 4 benefit from the simple manufacturing process made possible by the integration of a band type check valve 152.

Figure 5:
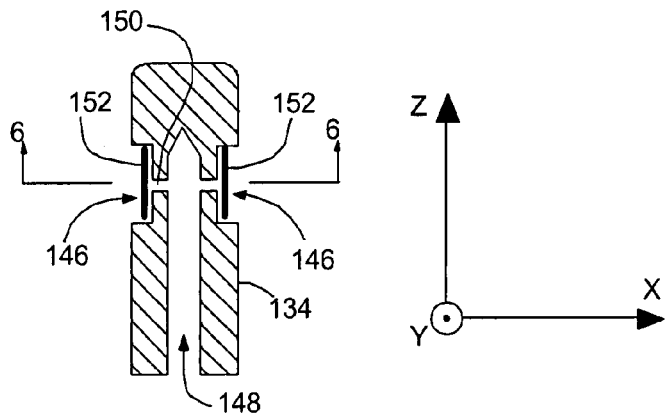
FIG. 5 partially illustrates the hydraulic tensioner of FIG. 4.
Figure 6:
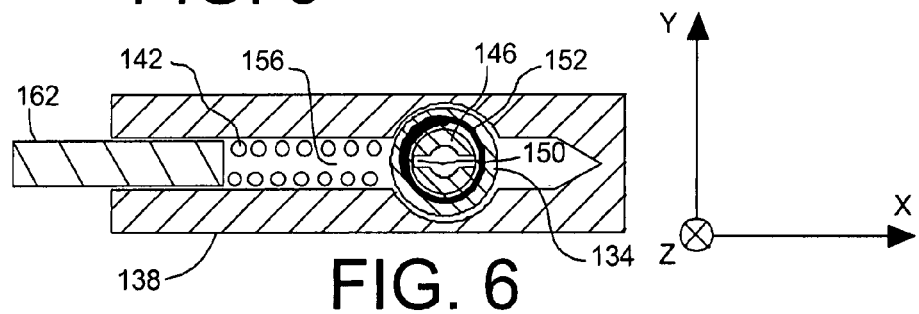
FIG. 6 illustrates a cross-section of FIG. 4 along lines 6-6 of FIG. 5.

FIG. 5 partially illustrates the hydraulic tensioner 122 shown in FIG. 4. The housing and the piston have been removed in this view, leaving only the inlet portion 134 and band check valve 152 assembly described above. A cross section along lines 6-6 of FIG. 5 is shown in FIG. 6. FIG. 6 is a cross-sectional view of the hydraulic tensioner 122 in FIG. 4, rotated back so that the positive Y-axis is pointing up. This view in FIG. 6 illustrates the band check valve 152 as it pertains to the inlet exit hole 150. In the embodiment of FIG. 6, the band check valve 152 wraps more than 360 degrees around the band valve guide area 146 where the exit hole 150 is located.

Figure 7:
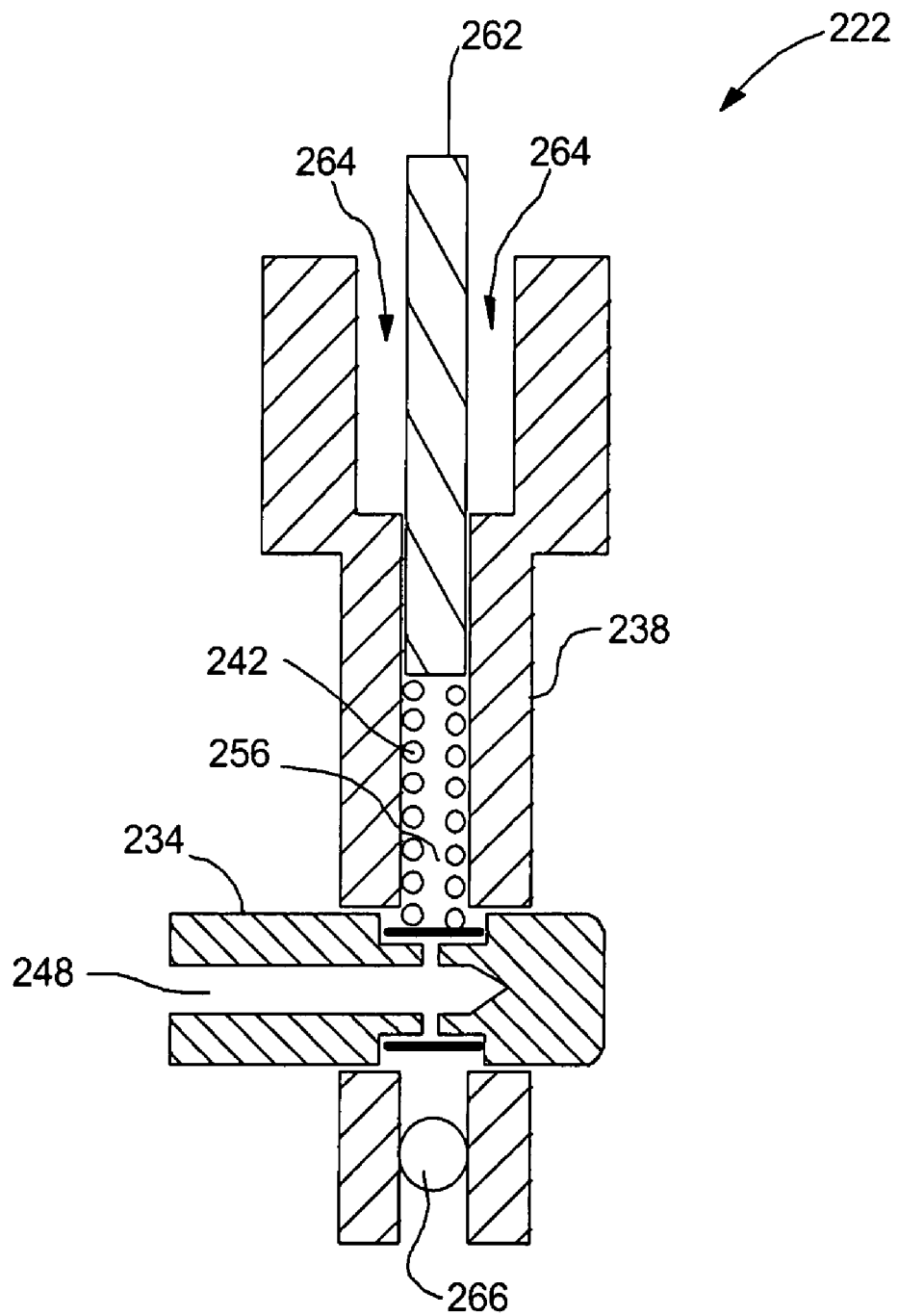
FIG. 7 illustrates a cross-section of a hydraulic tensioner in yet another embodiment of the present invention.

FIG. 7 illustrates a further embodiment of a hydraulic tensioner 222 in cross-section. This embodiment is similar to the embodiment of FIG. 4, but the housing defines a well area 264 around part of the piston 262 where it exits the housing 238. A natural leak path is present between the housing 238 and the piston 262. The addition of well area 264 allows the capture of leakage oil from the hydraulic tensioner 222, thereby helping to prevent air from entering the tensioner when the internal tensioner pressure is lower than the surrounding pressure. This may occur when the piston is rapidly extending. The well area 264 may be formed by using a larger drill bit on the piston end of the housing 238. The embodiment of FIG. 7 also illustrates an alternative manufacturing technique which may be used to make the chamber 256 within the housing 238. In previous embodiments, the chamber 56, 156 is shown as being drilled into one end of the housing 38, 138 while not exiting the other end of the housing 38, 138. In this embodiment, the chamber hole 256 is drilled all the way through the housing 238. A plug 266, such as a ball bearing, may be press-fit into the end of the chamber 256 opposite the piston 262 to seal the chamber 256. This may offer manufacturing advantages in situations where it is quicker and/or less expensive to cut pieces of pre-drilled housing and plug them versus having to precision drill one side of the chamber while not exiting the other side.

Figures 8A, 8B, 8C:
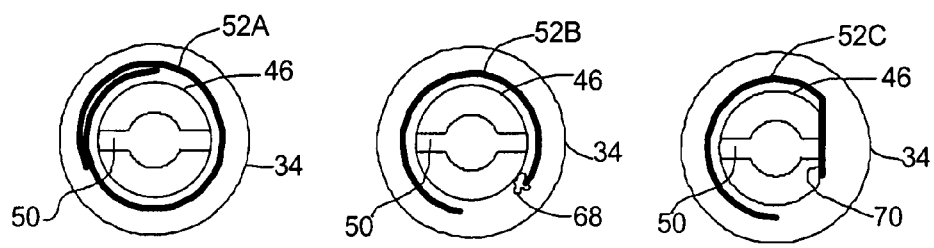
FIG. 8A illustrates a band check valve in an embodiment of the present invention.
FIG. 8B illustrates a band check valve in another embodiment of the present invention.
FIG. 8C illustrates a band check valve in yet another embodiment of the present invention.

For simplicity, the band check valve 52 and inlet portion 34 are schematically illustrated by themselves in FIGS. 8A-8E. The band check valves shown in FIGS. 8A-8E may be used in any of the embodiments of the hydraulic tensioners discussed herein. FIG. 8A illustrates an embodiment of a band check valve 52A which wraps more than 360 degrees around the band valve guide area 46 where the exit hole 50 is located. With a greater-than-360-degree band check valve 52A, the orientation of the band check valve 52A is not important. In fact, this type of band check valve 52A may rotate during operation without affecting its operation.

FIG. 8B illustrates an embodiment of a band check valve 52B which is coupled to the band valve guide area 46 of the inlet portion 34 by a solder or weld 68. Since the orientation of welded band check valve 52B is fixed, a band check valve of 360 degrees or less may be used.

FIG. 8C illustrates an embodiment of a band check valve 52C which makes use of a slightly different band valve guide area 46 on the inlet portion 34 than has been described to this point. In this embodiment, a flat portion 70 may be milled or formed onto the band valve guide area 46 of the inlet portion 34. A band check valve 52C of less than 360 degrees may be formed to have a flat side which corresponds to the flat portion 70. While this embodiment adds additional steps to the manufacture of the band valve guide area 46, it may offer advantages for easier installation of the check valve than the embodiments shown in FIGS. 8A-8B, since the band check valve 52C may be sized so that it just needs to be snapped into place.

Figures 8D, 8E:
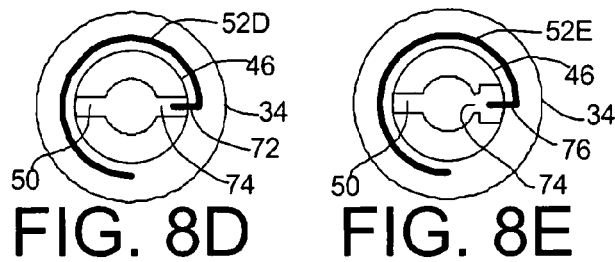
FIG. 8D illustrates a band check valve in another embodiment of the present invention.
FIG. 8E illustrates a band check valve in another embodiment of the present invention.

FIG. 8D illustrates an embodiment of a band check valve 52D which offers a possible advantage over the embodiment of FIG. 8C while still allowing for easier installation of the band check valve 52D. The band check valve 52D is provided with a tab 72 which may be fit into the unused exit hole 74. Recalling the discussion regarding the formation of exit hole 50 above, it should be noted that an extra or unused exit hole 74 may be formed with a single drilling operation while making the main exit hole 50. The tab 72 on the band check valve 52D orients the band check valve 52D without needing to change the configuration of the band valve guide area 46 of the inlet portion 34. The tab 72 is less wide than the band check valve 52D where it covers the exit hole 50.

FIG. 8E illustrates another embodiment of a band check valve 52E. In this embodiment, the unused exit hole 74 is enlarged by an additional drilling process to allow for a full-width tab 76 to be bent into the band check valve. This bend in the band check valve 52E may be snapped in to engage the extra exit hole 74.

Figure 9:
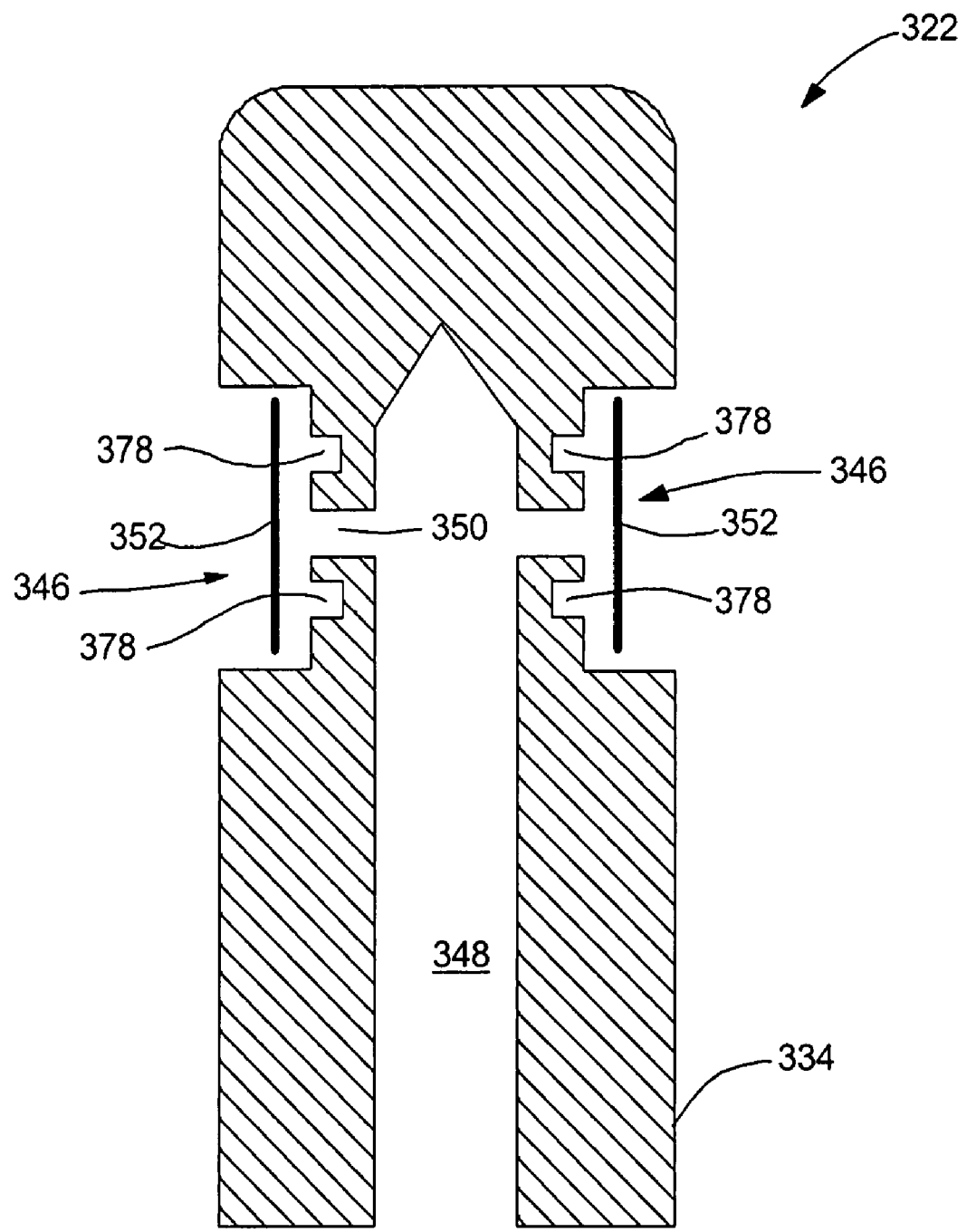
FIG. 9 partially illustrates a hydraulic tensioner where the band check valve curls inward in an embodiment of the present invention.

FIG. 9 illustrates an embodiment of an inlet portion 334 with a band valve guide area 346 which defines an exit hole 350 coupled to the inlet hole 348. Embodiments of hydraulic tensioners with this structure have been discussed above with regard to a band check valve 352. In this case, the band check valve 352 is spring biased so that it is trying to curl up, and will therefore exert an inward force onto the band valve guide area 346 of the inlet portion 334 where the exit hole 350 comes through.

It has been discovered experimentally that debris may build up over time between the band check valve 352 and the band valve guide area 346. This build-up of debris may cause a leakage problem, by preventing the band check valve from sealing properly. To alleviate this issue, one or more grooves 378 may be formed in the band valve guide area 346 of the inlet portion 334 underneath where the band check valve 352 makes contact. The grooves 378 may act as places for debris to gather while also helping to create a known and/or more reliable pop-off or release pressure of the band check valve 352. The grooves 378 may also be used to reduce the surface adhesion of a clean band check valve 352 so that a lighter weight band check valve 352 may possibly be used, although it is not necessary to use a lighter band check valve material with a textured or grooved band valve guide area. As an alternative to grooves 378, the band valve guide area 346 of the inlet portion 334 may be roughened, scratched, or otherwise textured to provide a similar benefit to grooves 378. The grooved or textured surface may also be designed as a known leak path. A known leak path can also act to flush debris away from the backside of the band check valve 352.

Figure 10:
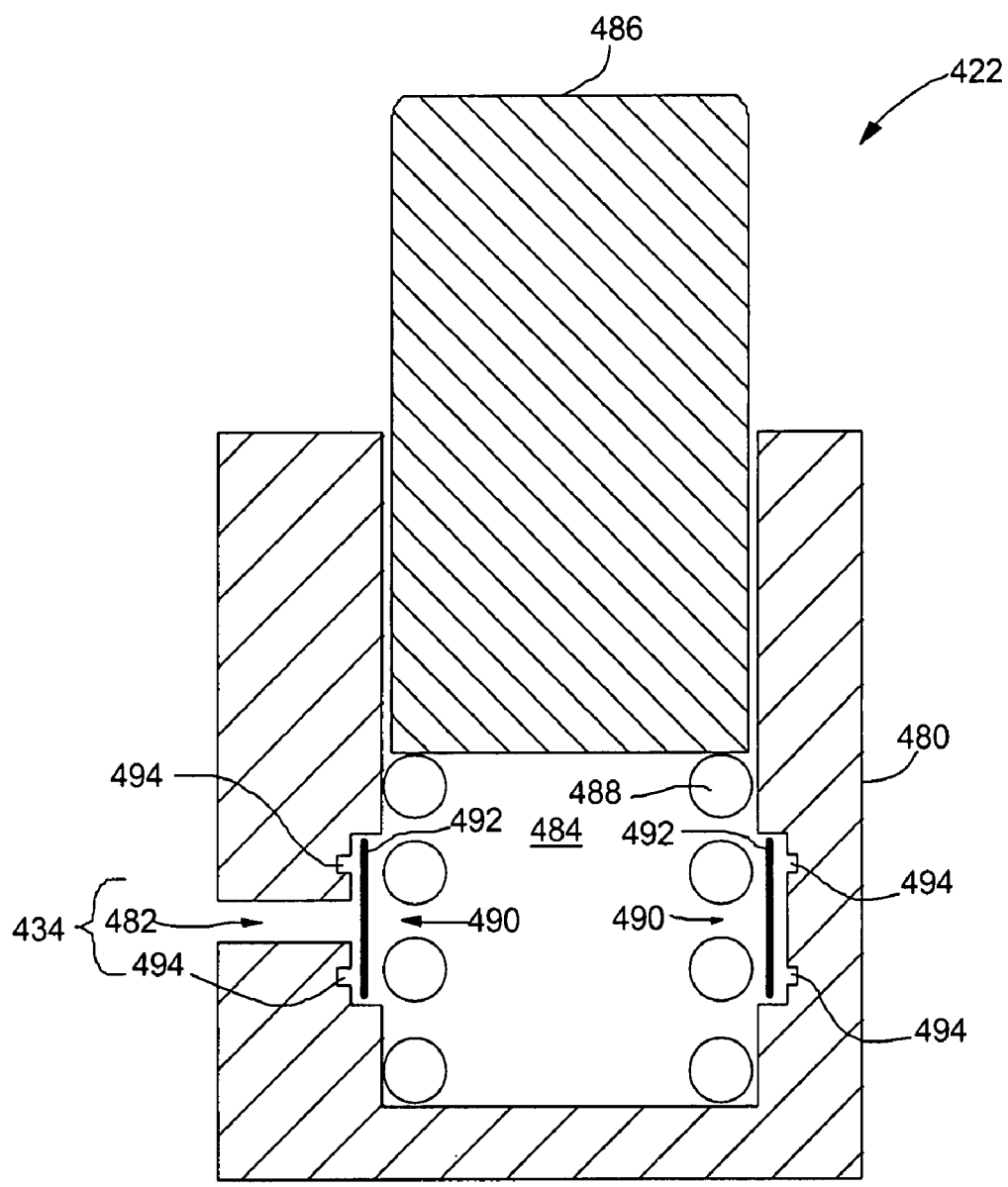
FIG. 10 partially illustrates a hydraulic tensioner where the band check valves curls outward in an embodiment of the present invention.

Up to this point, all hydraulic tensioner embodiments have shown band check valves which tend to curl in upon themselves. It is also possible to have embodiments where the band check valves tend to curl outwards. FIG. 10 illustrates this type of alternative embodiment for a hydraulic tensioner 422. This hydraulic tensioner includes a housing 480 which includes a pressurized oil inlet 482 which enters radially as opposed to the axial entrance in previous embodiments. The inlet portion 434 is integral with the housing 480 in this embodiment. The housing 480 defines a chamber 484 which slideably engages a piston 486. The piston 486 is biased away from the housing 480 by spring 488 and the hydraulic pressure in the chamber 484. A band valve guide area 490, such as an annular recessed area may be formed around all or part of the circumference of the chamber 484. A band style check valve 492 may be installed in the band valve guide area 490, the band check valve 492 in this case being sprung outward to seal off the inlet 482.

When the hydraulic pressure in the inlet 482 exceeds the hydraulic pressure in the chamber 484 plus the spring force of the band check valve 492, the band check valve 492 moves away from the inlet 482 hole, allowing pressurized hydraulic fluid to fill the chamber 484. As pressure in the chamber 484 increases, the band check valve 492 returns to a sealing position where the inlet 482 hole is covered and not in fluid communication with the chamber 484. As discussed before with other embodiments, the band check valve 492 may be greater than, equal-to, or less than 360 degrees, and may or may not contain tabs, bends, or welds to align it within the band valve guide area 490. The embodiment of FIG. 10 is also illustrated with annular grooves 494, which operate similarly to the grooves 378 discussed with regard to the hydraulic tensioner of FIG. 9. The grooves 494 are not necessary in a hydraulic tensioner having a band style check valve, but can be used to improve the pop-off and sealing performance, and/or provide a known leak path, as discussed above.

In a method of the present invention, a hydraulic tensioner is manufactured by drilling a chamber into a housing, drilling a hydraulic fluid inlet in an inlet portion, forming a band valve guide area on the inlet portion, drilling an exit hole through the band valve guide area to be in communication with the hydraulic fluid inlet, and coupling a band check valve to the band valve guide area such that the band check valve may cover the exit hole and act as a check valve between the hydraulic fluid inlet and the chamber.

Accordingly, it is to be understood that the embodiments described herein are merely illustrative of the application of the principles of the invention. Reference herein to details of the illustrated embodiments is not intended to limit the scope of the claims, which themselves recite those features regarded as essential to the invention.

What is claimed is:

1. A hydraulic tensioner, comprising:
an inlet portion comprising a band valve guide area and defining a pressurized fluid inlet;
a housing defining a chamber, the housing being coupled to the inlet portion;
a band check valve comprising a band seated on the band valve guide area, the band check valve separating the pressurized fluid inlet from the chamber; and
a piston slideably engaging the housing;
wherein the band valve guide area is sized to receive the band and defines an exit hole within the band valve guide area coupled to the pressurized fluid inlet; and
wherein the band valve guide area of the inlet portion further comprises at least one groove positioned to be at least partially behind the band check valve.

2. The hydraulic tensioner of claim 1, wherein the inlet portion is integral to the housing.

3. The hydraulic tensioner of claim 1, wherein the band check valve is biased in an outward direction.

4. The hydraulic tensioner of claim 1, wherein the band check valve is biased in an inward direction.

5. The hydraulic tensioner of claim 1, wherein the piston slideably engages an outside surface of the housing.

6. The hydraulic tensioner of claim 1, wherein the piston slideably engages an inside surface of the housing.

7. The hydraulic tensioner of claim 1, wherein the band check valve wraps 360 degrees or greater around the band valve guide area of the inlet portion.

8. The hydraulic tensioner of claim 1, wherein the band check valve wraps less than 360 degrees around the band valve guide area of the inlet portion.

9. The hydraulic tensioner of claim 1, wherein the band check valve is welded to the band valve guide area of the inlet portion at at least one point.

10. The hydraulic tensioner of claim 1, wherein the band valve guide area further comprises a flattened area away from the exit hole; and the band check valve further comprises a flat section coupled to the flattened area of the band valve guide area.

11. The hydraulic tensioner of claim 1, wherein the band check valve comprises a tab coupled to a hole in the band valve guide area of the inlet portion.

12. The hydraulic tensioner of claim 1, wherein the band check valve comprises a bent portion coupled to a hole in the band valve guide area of the inlet portion.

13. The hydraulic tensioner of claim 1, wherein the band valve guide area further comprises a surface selected from the group consisting of a roughened surface; a scratched surface; and a textured surface.

14. The hydraulic tensioner of claim 1, further comprising a spring biasing the piston away from the housing.

15. The hydraulic tensioner of claim 1, wherein the band check valve is annular.

16. A hydraulic tensioner, comprising:
an inlet portion having an interior and an exterior, and comprising a pressurized fluid inlet on the interior, a band valve guide area with at least one groove on the exterior, and an exit hole between the band valve guide area and the pressurized fluid inlet;
a band biased in an inward direction and coupled to the band valve guide area of the inlet portion exterior, thereby forming a band check valve such that the band check valve covers the exit hole;
a housing defining a chamber in an axial direction, the chamber being open to a first end of the housing, the housing having an inlet coupling hole in a radial direction, the inlet coupling hole being coupled to the chamber and being sized to receive the inlet portion such that the band check valve separates the pressurized fluid inlet from the chamber and such that the band check valve may be flexed outward by hydraulic pressure to allow fluid from the pressurized fluid inlet to enter the chamber;
a piston slideably engaging the housing and hydraulically coupled to the chamber; and
a spring biasing the piston away from the housing;
wherein the groove is positioned to be at least partially behind the band check valve.

17. A hydraulic tensioner, comprising:
an inlet portion comprising a band valve guide area and defining a pressurized fluid inlet;
a housing defining a chamber, the housing being coupled to the inlet portion;
a band check valve comprising a band seated on the band valve guide area, the band check valve separating the pressurized fluid inlet from the chamber; and
a piston slideably engaging the housing;
wherein the band valve guide area is sized to receive the band and defines an exit hole within the band valve guide area coupled to the pressurized fluid inlet; and
wherein the band valve guide area further comprises a surface selected from the group consisting of a roughened surface; a scratched surface; and a textured surface.

18. The hydraulic tensioner of claim 17, wherein the inlet portion is integral to the housing.

19. The hydraulic tensioner of claim 17, wherein the band check valve is biased in an outward direction.

20. The hydraulic tensioner of claim 17, wherein the band check valve is biased in an inward direction.

21. The hydraulic tensioner of claim 17, wherein the piston slideably engages an outside surface of the housing.

22. The hydraulic tensioner of claim 17, wherein the piston slideably engages an inside surface of the housing.

23. The hydraulic tensioner of claim 17, wherein the band check valve wraps 360 degrees or greater around the band valve guide area of the inlet portion.

24. The hydraulic tensioner of claim 17, wherein the band check valve wraps less than 360 degrees around the band valve guide area of the inlet portion.

25. The hydraulic tensioner of claim 17, wherein the band check valve is welded to the band valve guide area of the inlet portion at at least one point.

26. The hydraulic tensioner of claim 17, wherein the band valve guide area further comprises a flattened area away from the exit hole; and the band check valve further comprises a flat section coupled to the flattened area of the band valve guide area.

27. The hydraulic tensioner of claim 17, wherein the band check valve comprises a tab coupled to a hole in the band valve guide area of the inlet portion.

28. The hydraulic tensioner of claim 17, wherein the band check valve comprises a bent portion coupled to a hole in the band valve guide area of the inlet portion.

29. The hydraulic tensioner of claim 17, further comprising a spring biasing the piston away from the housing.

* * * * *